United States Patent [19]

Huck

[11] 4,240,948

[45] Dec. 23, 1980

[54] ACCELERATED RESOLE BINDER

[75] Inventor: Rodney M. Huck, Longmeadow, Mass.

[73] Assignee: Monsanto Company, St. Louis, Mo.

[21] Appl. No.: 99,048

[22] Filed: Nov. 30, 1979

[51] Int. Cl.³ .............................................. C08L 61/10
[52] U.S. Cl. .................................... 260/29.3; 528/165
[58] Field of Search ............... 260/29.3; 528/165, 136, 528/144; 428/375

[56] References Cited

U.S. PATENT DOCUMENTS

| | | | |
|---|---|---|---|
| 4,011,186 | 3/1977 | Higginbottom | 260/29.3 |
| 4,043,970 | 8/1977 | Dahms | 260/29.3 |
| 4,045,398 | 8/1977 | Dahms | 260/29.3 |
| 4,052,359 | 10/1977 | Higginbottom | 260/29.3 |

Primary Examiner—Theodore E. Pertilla
Attorney, Agent, or Firm—David Bennett; William J. Farrington; Edward P. Grattan

[57] ABSTRACT

A resole resin composition suitable for use as a component of a binder comprises a water-soluble resole resin and an accelerator which is a $C_1$ to $C_4$ alkyl partial ester of an aromatic polycarboxylic acid.

5 Claims, 3 Drawing Figures

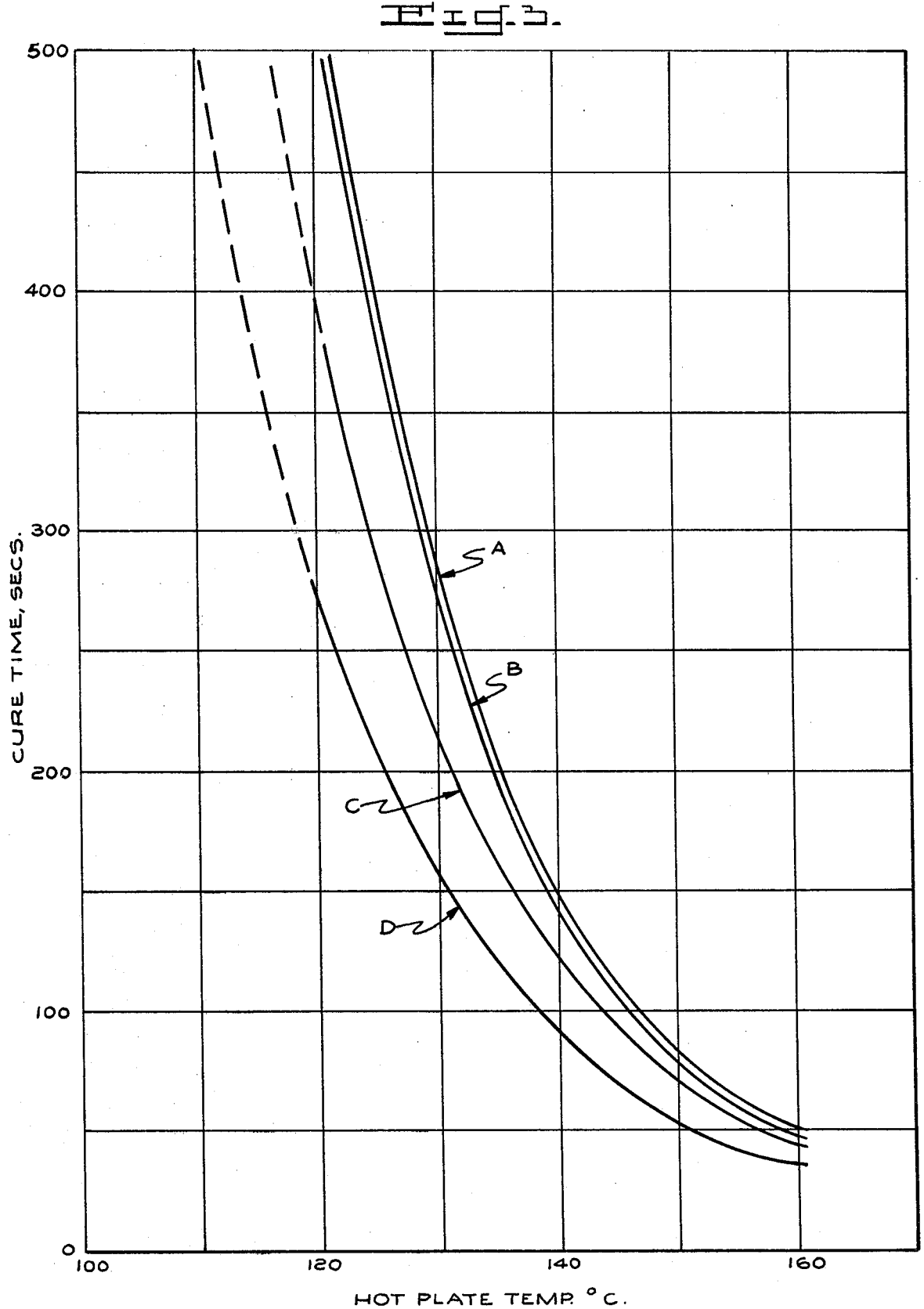

ACCELERATED RESOLE BINDER

BACKGROUND OF THE INVENTION

Phenolic resole resins are prepared by the reaction of a phenolic compound with formaldehyde in the presence of an alkaline catalyst. Curing of the resole to a crosslinked mass is accelerated by addition of an acid which also serves to neutralize, in whole or in part, the alkaline catalyst residue.

This curing is extremely important in that it should preferably be very fast and very complete so as to shorten the processing time required.

Processing speed is important in many industrial resole resin applications for cost considerations and energy conservation. In making paper filters for example, the substrate paper is drawn through a dip tank containing a phenolformaldehyde resole resin binder solution, then drawn continously through a heated oven to remove most of the volatile material and advance the resin somewhat. The faster the rate of cure, the more energy efficient is the process.

Several ways to improve processing speed are known. One is to increase the molecular weight of the resin and the other is to use higher solids resin solutions. Both methods suffer because of problems in getting adequate penetration of the resin into the substrate, leading to poorer final laminate appearance and greater water absorption which also gives poorer electrical properties. Generally, a low viscosity resin solution and/or low molecular weight resin is desirable for good substrate penetration and the molecular weight of the resin is raised during the heating step. Increasing the molecular weight in the impregnated substrate, (the prepreg), is needed so that when the prepreg is cured under heat and pressure, excessive resin flow out of the substrate is not encountered.

Another method of improving the cure rate and therefore the processing speed is the selection of a suitable acid catalyst. It is this preferred technique that is the focus of the present invention which describes an accelerated resole composition comprising a neutralizing acid that gives unexpectedly advantageous cure rates.

The resole resin compositions of the present invention are particularly useful as components of binders in the production of fiber-glass insulation materials. Conventionally such products are made by forming a mat of glass fibers, spraying the mat with a binder and then curing the binder. The cured binder serves to stabilize the glass fiber structure dimensionally such that it can be handled and installed easily. One problem with such insulation sheet materials is their bulk which is such that it is highly attractive, from an economic standpoint, to compress them to a fraction of their original thickness before transporting them. It is therefore necessary that the resin-bonded glass fiber mat recover as much as possible of its original thickness when the compressive forces are released. This property is known as the "Recovery" of the mat. Recovery has been no great problem using glass mats prepared from borosilicate glass fibers. However with a high soda or soda-lime glass it has been found that conventional resole compositions do not function so well. Recoveries of over 80 percent, are relatively easily obtained with borosilicate glass, but recoveries of only around 75 percent are typical using existing resole compositions with the soda-lime type of glass.

One particular advantage of the resole compositions of the present invention is that they are capable of giving a glass fiber insulation material with excellent recovery after compression even with soda-lime glass. The "recovery" obtained will depend on the mat employed and the amount of resin used as well as the conditions. The results are therefore essentially comparative within a series run with only one variable changed. Generally the test employs a glass fiber mat sprayed with a fixed amount of the resin, usually from 10–15% weight of the treated mat weight which is then compressed to a given fraction, say about to 25 percent of its original thickness for 2 hours at 95 percent humidity and 68° C. before being released and conditioned under standard temperature and humidity conditions.

DESCRIPTION OF THE PRIOR ART

It is known to use an acid as an accelerator for resole resin curing reactions. The selection of a suitable acid has not however, been quite so easy since the neutralization catalysts should preferably be compatible with the resin to avoid precipitation problems. At the same time the salt generated should not give rise to moisture sensitivity problems. One of the more successful acid curing additives is oxalic acid and its use is described in U.S. Pat. Nos. 4,052,359 and 4,011,186.

DESCRIPTION OF THE INVENTION

It has now been found that a resole resin can be cured at a very advantageous rate by the use of a specified organic acid. What is more, binders comprising such resole resin compositions as components give fiber-glass mats with excellent recovery even when used with high soda glasses.

The present invention provides a water soluble resole resin composition comprising a resole resin with a number average molecular weight from 150 to 300 and, as curing accelerator therefore, from 0.5 to 10 percent by weight based on the resin weight of a $C_1$ to $C_4$ alkyl partial ester of an aromatic polycarboxylic acid.

The amount of the acid accelerator is clearly determined, at least in part, by the desired pH of the end product. Since this in turn is related to the cure rate, the amount of acid added should be such as to effect the desired rate of cure. As will become apparent from the data hereinafter presented, the fastest cure rates appear to be achieved at a pH of between 7.9 and 8.5 and preferably between 8.1 and 8.3 and so for fastest cures, enough acid should be added to place the pH of the solution in that range. In general that will imply the addition of from 0.5 to 5 and preferably from 1 to 4 percent parts by weight of the acid based on 100 parts of resin, if the alkaline resinification catalyst has been added in conventional amounts.

ACCELERATOR

The accelerator used in the resole resin compositions of the invention is a partial ester of an aromatic polycarboxylic acid.

Suitable acids and anhydrides that can be used to react with $C_1$ to $C_4$ alcohols to form accelerators useful in the present invention include phthalic acid, isophthalic acid, terephthalic acid, trimellitic anhydride, chlorendic anhydride, tetra-phthalic anhydride, a methylated maleic acid adduct of phthalic anhydride and pyromellitic dianhydride.

In general partial esters are formed more readily from anhydrides than from acids so that esters derived from polycarboxylic acids that are capable of existing in the anhydride state are preferred in practice.

For best results the accelerator chosen should be soluble in the resin and should give rise to a pH-stable composition. It is also desirable that it be nontoxic and inexpensive.

The cheapest and most readily available acid is phthalic acid and in practice this is preferred because it is also capable of yielding highly effective curing agents. The preferred partial esters are half esters of phthalic acid.

The partial ester can be formed by reaction of the polycarboxylic acid, or better its anhydride with an alcohol selected from methyl alcohol, ethyl alcohol, propyl alcohol, isopropyl alcohol, butyl alcohol and isobutyl alcohol. In general the preferred partial esters are isopropyl acid phthalate (hereinafter abbreviated to IPAP for convenience), methyl acid phthalate (MAP) and isobutyl acid phthalate (IBAP).

RESOLE RESINS

The preferred water soluble phenol/formaldehyde resole resins are largely mixtures of mono-, di- and trimethylolphenols with some unreacted phenol and formaldehyde. The resins are only slightly condensed and the number average molecular weight of the resin before curing is from 150 to 300 and preferably from 205 to 240.

Preferred resins have an F/P ratio of from about 2.2 to 2.5:1 and an average of from 1.25 to 1.40 phenolic rings per resin molecule.

The phenolic component of the resin is preferably predominantly phenol itself though polyhydroxyphenols such as resorcinol could be used. In general substantial amounts of phenol homologues such as cresols, xylenols and the like lead to resin insolubility.

The resins are preferably made by charging high F/P ratios, for example from 3 to 3.5:1, and reacting at relatively low temperatures to prevent condensation. Suitable reaction temperatures are generally in the range 60° to 75° C.

The amount of alkali catalyst used in the most efficient processes is sufficient to drive the free formaldehyde content down to the desired level within about 3 to 4 hours. Longer reaction times though less efficient as a rule may be used if desired.

The resin solution is generally not concentrated by dehydration as this tends to affect adversely the dilutability. The preferred resin solution thus contains about 50 to 55 percent resin solids and this is usually diluted to 15 to 30 percent solids to produce a binder composition. The resin should preferably have a water dilutability of about 30:1; a pH of 25° C. of from 8.0 to 8.2; a free formaldehyde content of about 5 to 10 percent by weight; and a free phenol content below about 1 percent weight.

USES

The fast curing resole resin compositions of the invention are useful as components of binder compositions in the production of fiberglass insulation and in other fields such as phenolic varnishes, binders and as molding resins.

TEST PROCEDURES

The examples that follow in illustration of the invention employ two experimental procedures for evaluating phenolic resins.

The "Recovery" test procedure has been described above. The other procedure measures "cure rate" and is frequently referred to as the dry-rubber test. It is used to give comparative rates of cure of resins. The interpretation of the phenomena observed is somewhat subjective though highly reproducible by the same observer. The test therefore, is best used herein to establish relative cure rates only. In the "dry rubber test" the composition is spread over a hot surface such as hot plate at a controlled temperature desired for drying and curing. A spatula is used to spread and work the composition. When the composition loses its tackiness and does not form viscous membranes on withdrawal of the spatula the composition is considered cured to the "dry rubber" state. The test is used to determine how many seconds to cure to a "dry rubber" state, hence the cure rate of the composition.

Figure 1:
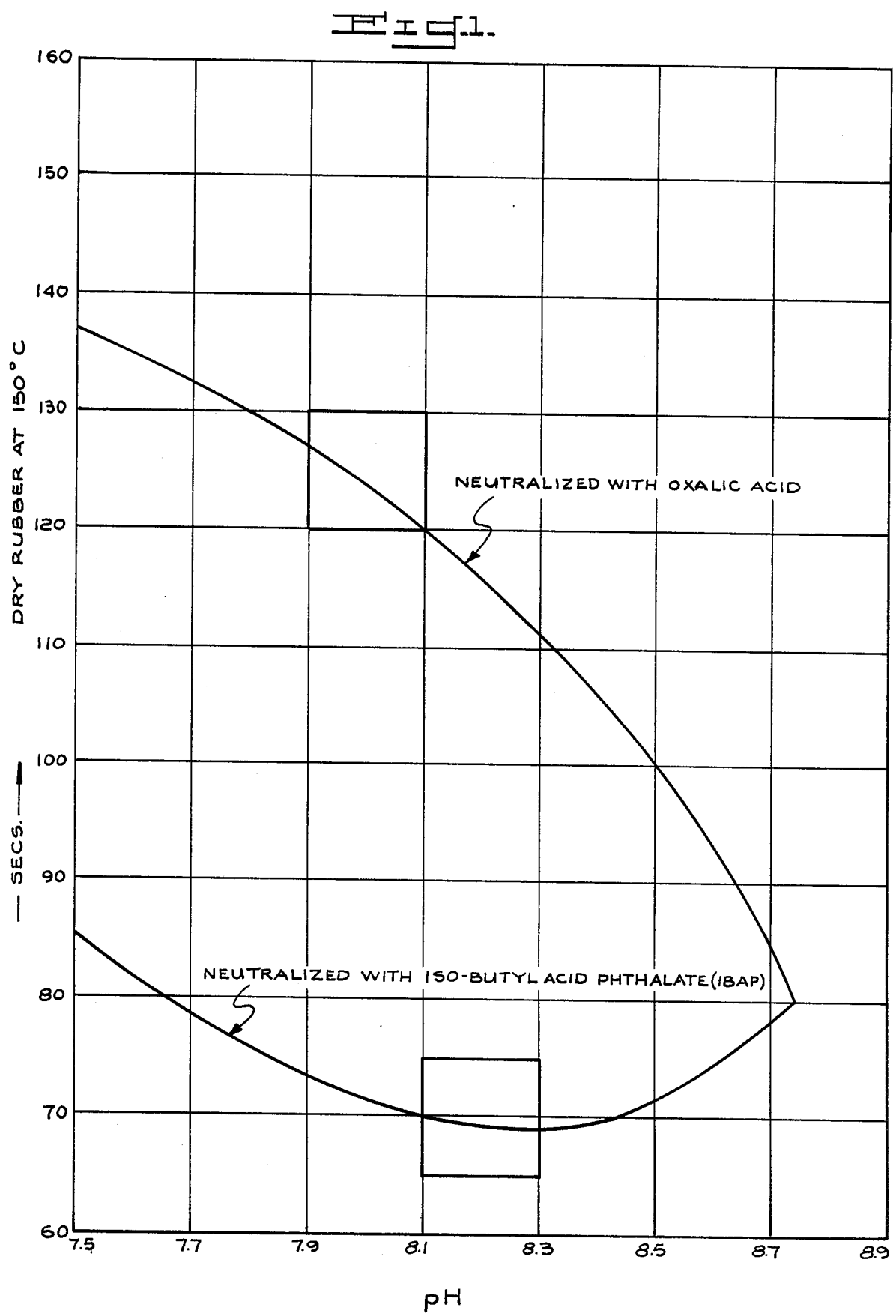
FIG. 1 is a graph showing the results obtained using the "dry rubber" test (described above) to assess the cure rate using a plate temperature of 150° C.
Figure 2:
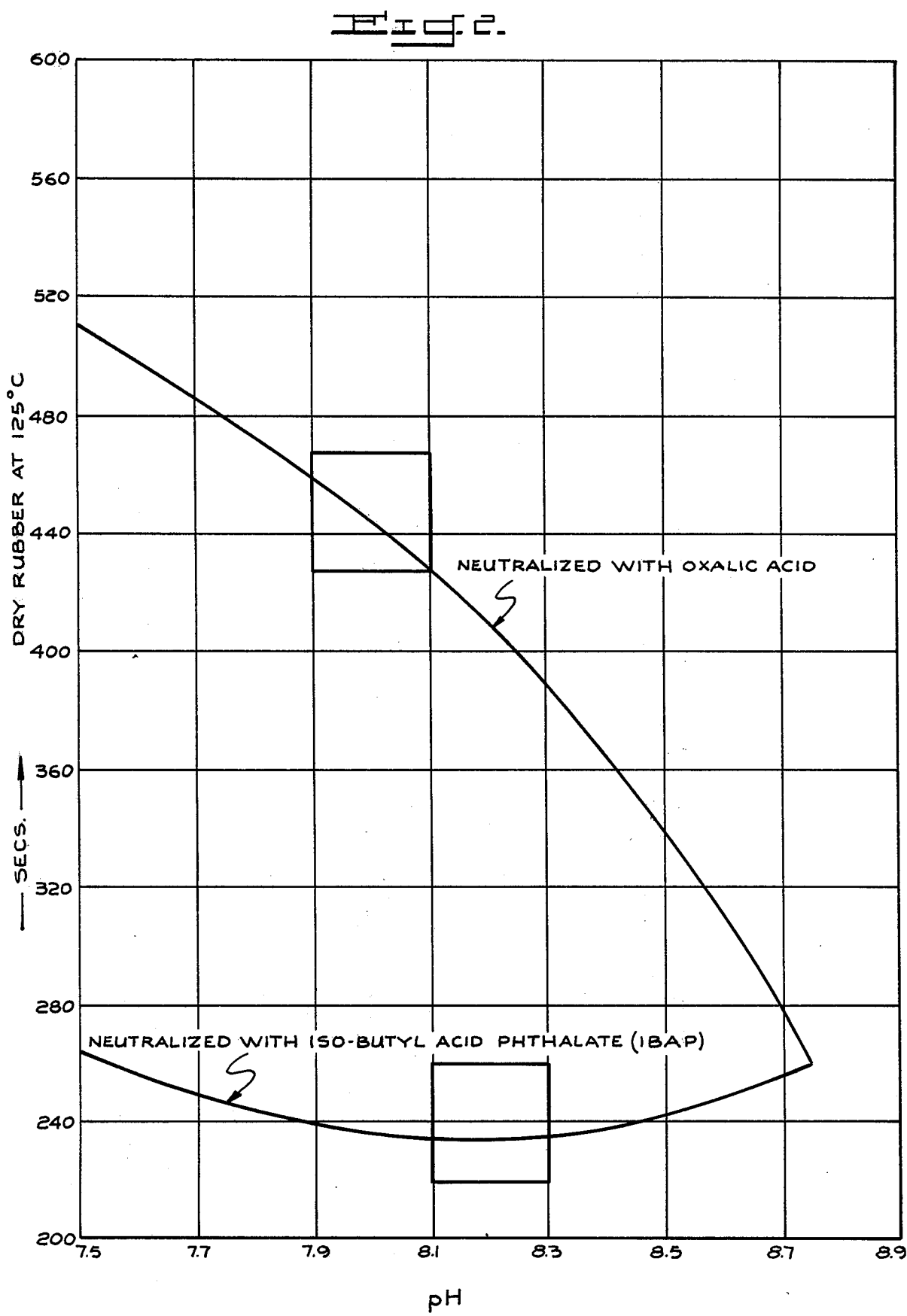
FIG. 2 is similar to FIG. 1 except that the plate temperature was 125° C.

In each of FIGS. 1 and 2 the performance of the resole resin of the invention is compared with a commercial resole of the prior art.

FIG. 3 is a graph of cure time against plate temperature for four resin compositions using the same "dry rubber" test referred to above.

DESCRIPTION OF THE PREFERRED EMBODIMENTS

The following Examples are for the purpose of illustration only and are not intended to imply any limitations on the essential scope of the invention.

EXAMPLE 1

This example assesses the cure rate of resole resins using the "dry rubber" test described above. A standard resole comprising formaldehyde and phenol in a reacted ratio of about 2.3 to 1 is mixed with varying amounts of an acid neutralizer and in each case the time taken for the resin to cure to a dry rubbery film was observed. This time was plotted against the pH of the resin/acid mixture to give the graphs appearing as FIGS. 1 and 2.

In FIG. 1, the plate temperature was 150° C. and Curve A is that obtained with standard resole using oxalic acid as the neutralizer. It should be noted that the cure time increases with the amount of oxalic acid added. The box on the curve between pH 7.9–8.1 is the region normally occupied by commercial resins of this type.

The lower curve on the other hand represents the variation of cure time with pH when the neutralizer is isobutyl acid phthalate. It is very clear that the cure time using such an acid as the neutralizer is much shorter than when oxalic acid is used and that there is a region approximately between pH 7.9–8.5 in which there is strong evidence of a substantial acceleration in the rate of cure of the resin.

This phenomenon is also shown at lower plate temperatures and FIG. 2 presents similar data collected at a plate temperature of 125° C.

From these graphs it can be seen that if sufficient isobutyl acid phthalate is added to lower the pH of the resin to between about 7.9 to 8.5 a very substantial improvement in cure rate can be anticipated.

EXAMPLE 2

This example demonstrates the utility of binders comprising the resole resin composition of the invention for the production of glass fiber insulation materials.

Five resin binder compositions (A, B, C, D and E) were prepared and applied to high soda glass mats one inch in thickness using the technique described above.

The first two binders (A and B) are examples of binders that have proved very effective with the conventional borosilicate glass fiber mats but which are less effective when used on soda-lime glasses. Resin A was catalyzed using lime so that on neutralization with $CO_2$, calcium carbonate was formed and had to be filtered out. Resin B was of the "dispersed salt" type described in U.S. Pat. No. 4,052,359. Binder compositions C, D, and E comprise the resole resin compositions of the invention.

The other components of the binder compositions are urea, aqueous ammonia, ammonium sulfate and a silane coupler are used in proportions that are conventional in the art and maintained at a substantially constant level except that the ammonium sulfate (which enhances cures) was reduced by about 30% for compositions C, D and E.

The compositions, the cure conditions and the percent recovery after the resiliency test are all given in Table 1 below.

From the data on Table 1 it can be seen that the use of IPAP produces a startling improvement in recovery of the glass fiber mat when used with soda-lime glass.

The "dry rubber" test was applied to the resin compositions used in binders A, B, C, and D and the cure time was plotted against the plate temperature. The graph obtained is presented as FIG. 3. From this it can clearly be seen that at the same plate temperature the use of the accelerations disclosed herein produced a very significant improvement in cure time.

The above examples and descriptions are illustrative of the invention. It is anticipated that many minor modifications and variations could be made without departing from the essential spirit of the invention. It is intended that all such variations and modifications be embraced within the purview of this invention.

What is claimed is:

1. A resole resin composition comprising an aqueous solution of a low resole resin with a number average molecular weight from 150 to 300 and, as curing accelerator therefore, from 0.5 to 10 percent by weight, based on the resin weight of $C_1$ to $C_4$ alkyl partial ester of an aromatic polycarboxylic acid.

2. A resole resin composition according to claim 1 in which the polycarboxylic acid is phthalic acid.

3. A resole resin composition according to either of claims 1 and 2 in which the esterifying group is selected from the group consisting of methyl and isopropyl.

4. A resole resin composition according to any of claims 1 to 3 in which the amount of the curing accelerator is sufficient to place the pH of the binder solution in the range 7.9 to 8.5.

5. A resole resin composition comprising an aqueous solution of a phenol formaldehyde resin with a number average molecular weight from 205 to 240 and from 1 to 4 percent by weight based on the resin weight of an accelerator selected from methyl acid phthalate and isopropyl acid phthalate.

* * * * *

TABLE 1

|  | A (Comparative) | B (Comparative) | C (Invention) | D (Invention) | E (Invention) |
| --- | --- | --- | --- | --- | --- |
| RESIN |  |  |  |  |  |
| F/P Ratio (reacted) | 2.4/1 | 2.3/1 | 2.3/1 | 2.3/1 | 2.3/1 |
| Catalyst | Lime | Lime/Caustic | Caustic | Lime | Lime |
| Accelerator/ Neutralizer | $CO_2$ filtered | Oxalic acid dispersed salt | IPAP | MAP soluble salt | IPAP |
| Type Resin (liqiud base) | 100 | 100 | 100 | 100 | 100 |
| CONDITIONS |  |  |  |  |  |
| Cure Time (mins) | 5 | 5 | 5 | 5 | 5 |
| Cure Temperature (°C.) | 232 | 232 | 232 | 232 | 232 |
| RECOVERY |  |  |  |  |  |
| Average Percentage | 74 | 73 | 80 | 83 | 81 |